US011182149B2

(12) United States Patent
Craik (10) Patent No.: US 11,182,149 B2
(45) Date of Patent: Nov. 23, 2021

(54) JUST-IN-TIME CODE PATCHING

(71) Applicant: International Business Machines Corporation, Armonk, NY (US)

(72) Inventor: Andrew James Craik, North York (CA)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 16/587,101

(22) Filed: Sep. 30, 2019

(65) Prior Publication Data

US 2021/0096843 A1 Apr. 1, 2021

(51) Int. Cl.
G06F 9/44 (2018.01)
G06F 8/656 (2018.01)
G06F 9/455 (2018.01)

(52) U.S. Cl.
CPC .......... *G06F 8/656* (2018.02); *G06F 9/45516* (2013.01)

(58) Field of Classification Search
CPC ............................ G06F 8/656; G06F 9/45516
See application file for complete search history.

(56) References Cited

U.S. PATENT DOCUMENTS

| | | | |
|---|---|---|---|
| 8,104,028 B2 | 1/2012 | Stoodley et al. | |
| 8,141,099 B2 | 3/2012 | DeWitt, Jr. et al. | |
| 9,164,754 B1 | 10/2015 | Pohlack | |
| 9,519,466 B2 | 12/2016 | Delsart | |
| 2002/0029357 A1* | 3/2002 | Charnell | G06F 9/4491 714/5.11 |
| 2011/0214110 A1 | 9/2011 | Baron et al. | |
| 2015/0370560 A1* | 12/2015 | Tan | G06F 9/30058 717/148 |

OTHER PUBLICATIONS

Yanluo (Just-In-Time Code Patching Framework Used In CS Read Barrier, May 2019) (Year: 2019).*
Jeon et al. "Reuse of JIT Compiled Code Based on Binary Code Patching in Javascript Engine," Journal of Web Engineering, vol. 11, No. 4, 2012, pp. 337-349, Rinton Press.
IBM, "IBM SDK, Java Technology Edition, Version 8," Printed Sep. 25, 2019, © Copyright IBM Corporation 2005, 2019, 4 pages https://www.ibm.com/support/knowledgecenter/en/SSYKE2_8.0.0/welcome/welcome_javasdk_version.html.
Soman et al., "Efficient and General On-Stack Replacement for Aggressive Program Specialization.," Research Gate, Proceedings of the International Conference on Software Engineering Research and Practice & Conference on Programming Languages and Compilers, SERP 2006, Las Vegas, Nevada, USA, Jun. 26-29, 2006, vol. 2, 8 pages.

(Continued)

*Primary Examiner* — Chat C Do
*Assistant Examiner* — Lenin Paulino
(74) *Attorney, Agent, or Firm* — Grant Johnson (57) ABSTRACT

A computer-implemented method and related system for runtime code patching comprises determining, by a runtime, that a runtime event occurred. In response to the determination, performing by the runtime blocking processing of the runtime event, and runtime patching a method in response to an executing thread associated with the method yielding. Each executing thread receives runtime patching and only methods currently executing are runtime patched. Unblocking the runtime event allows execution to continue.

17 Claims, 8 Drawing Sheets

(56) References Cited

OTHER PUBLICATIONS

Soman et al., "Efficient On-Stack Replacement for Aggressive Specialization of Java Programs," UCSB Technical Report #2004-24, Sep. 2004, 23 pages.
Yanluo7, "Just-In-Time code patching framework used in CS read barrier #3847," GitHub, Printed Sep. 27, 2019, 3 pages, Grace Period Disclosure.
"IBM open source graduated to Eclipse OpenJ9," Boost your Java Application performance with Open J9, IBM, Published Dec. 21, 2018, 3 pages.
"Eclipse Open J9," Eclipse Incubation, Printed Sep. 27, 2019, 6 pages.
"The JIT compiler," IBM, Printed Sep. 27, 2019, 3 pages.
"Welcome to the Eclipse OpenJ9 repository," GitHub Eclipse Open J9, Printed Sep. 27, 2019, 3 pages.
Mell et al., "The NIST Definition of Cloud Computing," Recommendations of the National Institute of Standards and Technology, U.S. Department of Commerce, Special Publication 800-145, Sep. 2011, 7 pages.

* cited by examiner

```
.int methodBodyPatchState   # 32bit per-method state data
ProcEntry                    # PROCENTRY
   lea r1 [rip-n]   # obtain effective address of methodBodyPatchState for later use
   load r2 [globalPatchState]   # load value of global state. use volatile regs for r1 r2
   xor r2, [r1]   # check whether method state matches global state
   jne lazyPatchSnippet   # branch to snippet if no match. Once body's patched, this simply falls thru
label mainline_continue:
   ...
   <main line code>
   ...
label lazyPatchSnippet:
   call jitLazyCodePatchHelper
   jmp mainline_ continue
```

FIG. 7

```
void concurrentScavengePatchMethodBody(void* methodBodyStateAddr)
  {
  int32 methodState = *((int32*) methodBodyStateAddr)
  if (methodState matches globalState)
     return // some other thread already patched the body
  // Get the runtime assumption list associated with jitted body @methodBodyStateAddr
  // Iterate the list and call patch method on each site
  *((int32*) methodBodyStateAddr) = methodState ^ MASK_CS_PATCH   // update bit in methodState
  }
```

FIG. 8

```
.int methodBodyPatchState   # 32bit per-method state data
ProcEntry                   # PROCENTRY
   lea r1 [rip-n]   # obtain effective address of methodBodyPatchState for later use
   load r2 [globalPatchState]   # load value of global state. use volatile regs for r1 r2
   xor r2, [r1]   # check whether method state matches global state
   jne lazyPatchSnippet   # branch to snippet if no match. Once body's patched, this simply falls thru
label mainline_continue:
   ...
   <main line code>
   ...
label lazyPatchSnippet:
   call jitLazyCodePatchHelper
   jmp mainline_ continue
```

FIG. 9

JUST-IN-TIME CODE PATCHING

BACKGROUND

The subject disclosure relates to compilers for programming languages and, in particular, to just-in-time compilation of interpreted languages.

Modern languages and their associated runtime systems, such as the Java programming language, provide many benefits to the programmer. One such benefit is portability, which generally means that programs written for the Java platform can run similarly on a wide variety of hardware and operating systems. This is achieved by compiling the Java code written by the programmer to an intermediate representation, called Java bytecode, instead of directly to architecture-specific machine code.

SUMMARY

According to one or more embodiments, a computer-implemented method is provided for runtime code patching, comprising determining, by a runtime, that a runtime event occurred. In response to the determination, the method further comprises, by the runtime environment, blocking processing of the runtime event, runtime patching a method when an executing thread associated with the method yields, wherein each executing thread receives runtime patching and wherein only methods currently executing are runtime patched, and unblocking the runtime event to continue execution.

According to one or more embodiments, a method for lazy runtime code patching is provided, comprising in response to a runtime event in a first thread of a program comprising a plurality of treads, triggering method entries in the plurality of threads to call a code patching infrastructure of a runtime environment, waiting for an executing thread in the plurality of threads to yield, and in response to the executing thread yielding, patching a method on a call stack belonging to the executing thread by the code patching infrastructure.

According to one or more embodiments, a computer system is provided comprising a just-in-time compiler and a runtime environment that executes instructions generated by the just-in-time compiler. The runtime environment is further adapted to determine that a runtime event occurred. In response to the determination, the runtime blocks processing of the runtime event, runtime patches a method when an executing thread associated with the method yields, wherein each executing thread receives runtime patching and wherein only methods currently executing are runtime patched, and unblocks the runtime event to continue execution.

Additional features and advantages are realized through the techniques disclosed herein. Other embodiments and aspects are described in detail herein. Refer to the description below and to the drawings for the various features and aspects disclosed herein.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Modern programming languages and their associated runtime systems, such as the Java language and Java runtime environment, often use a Just-in-Time (JIT) compiler to compile natively executable versions of frequently executed fragments of program code to boost performance. The compiled code generated by a JIT compiler, however, is often optimized based on assumptions about program's execution environment. Unfortunately, changes to that operating environment may invalidate those assumptions. With modern language runtimes' reliances on aggressive JIT compilation, the number of such compile-time assumptions and the amount of JIT compiled code are making so-called invalid assumption events occur more frequently and be more costly. Similarly, modern programming paradigms, such as artificial intelligence, inherently change their execution patterns as they execute and learn, and thus, may invalidate compile time assumptions.

Accordingly, some embodiments may handle events, such as invalid assumptions, instrumentation requests, garbage collection activities, and the like, using runtime code patching i.e., modifying/rewriting the sequence of complied, executable instructions in memory. Some embodiments may further reduce the impact of runtime code patching by amortizing the patching cost across the execution of the application. This may provide two important benefits: (i) only code that executes will be modified; and (ii) the time required to record and handle an event may be reduced, thus increasing the execution performance of the runtime system.

Some embodiments use a two-stage mechanism for implementing runtime code patching which amortizes the cost of code patching across program execution. For example, when a runtime event occurs that invalidates compile-time assumptions, modification of the compiled code may be done in two stages. First, method entries in some embodiments may be modified to call the runtime environment's code patching infrastructure so that methods will be patched before execution of the method begins. Second, the runtime system waits for each executing thread to yield. When the yield takes place, each method on the execution thread's call stack has its code patching logic executed and their method entry sequences restored to normal. Once the threads have yielded, the runtime event handling logic is complete and execution of the thread where the event originated can be resumed.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
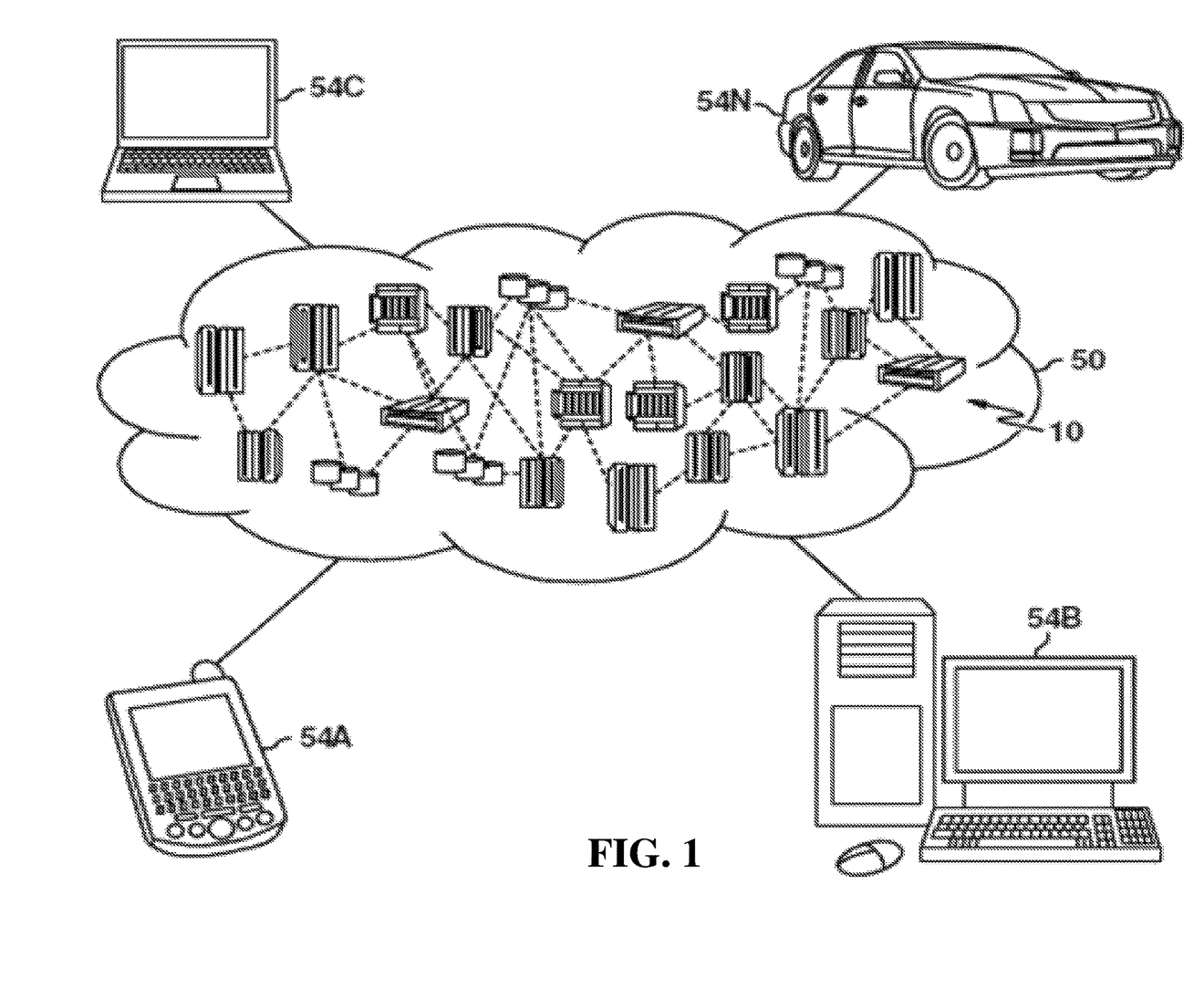
FIG. 1 depicts a cloud computing environment according to some embodiments.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
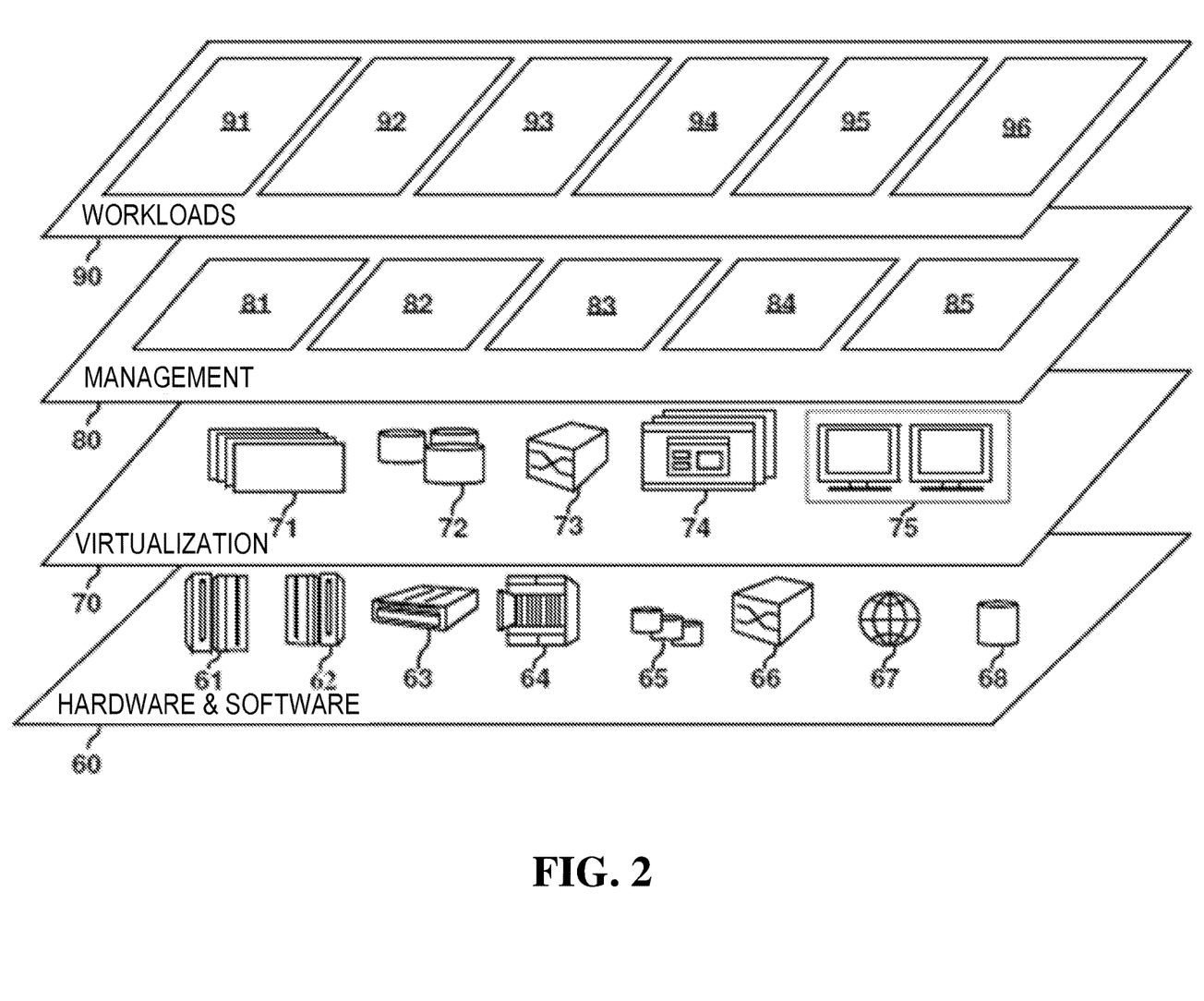
FIG. 2 depicts abstraction model layers according to some embodiments.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and runtime environment 96.

Data Processing System

Figure 3:
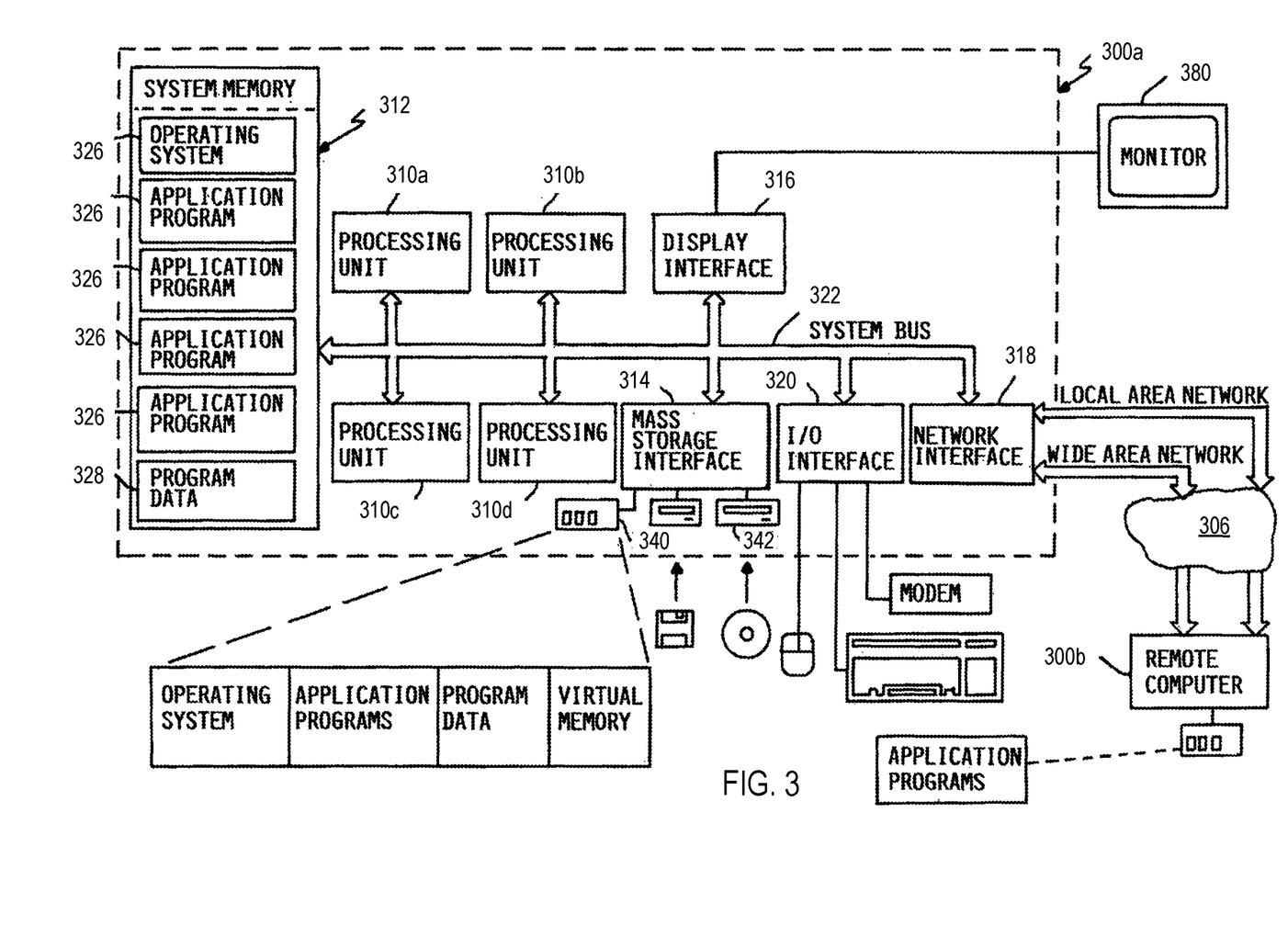
FIG. 3 is a block diagram of a data processing system according to some embodiments.

FIG. 3 illustrates one embodiment of a data processing system (DPS) 300 suitable for use as one of the cloud computing nodes 10 described with reference to FIGS. 1 and 2. Significantly, FIG. 3 only depicts the representative major components of the DPS 300 and that individual components may have greater complexity that represented in FIG. 3. In some embodiments, the DPS 300 is implemented as a personal computer; server computer; portable computer, such as a laptop or notebook computer, PDA (Personal Digital Assistant), tablet computer, or smart phone; processors embedded into a larger devices, such as an automobile, airplane, teleconferencing system, appliance; smart devices; or any other appropriate type of electronic device. Moreover, components other than or in addition to those shown in FIG. 3 may be present, and that the number, type, and configuration of such components may vary.

The data processing system 300 in FIG. 3 comprises a plurality of central processing units 310a-310d (herein generically referred to as a processor 310 or a CPU 310) connected to a main memory unit 312, a mass storage interface 314, a terminal/display interface 316, a network interface 318, and an input/output ("I/O") interface 320 by a system bus 322. The mass storage interfaces 314 in this embodiment connect the system bus 322 to one or more mass storage devices, such as a direct access storage device 340 or a readable/writable optical disk drive 342. The network interfaces 318 allow the DPS 300 to communicate with other DPS 300 over the communications medium 306. The main memory unit 312 also contains an operating system 324, a plurality of application programs 326, and program data 328.

The data processing system 300 embodiment in FIG. 3 is a general-purpose computing device. Accordingly, the processor's 310 may be any device capable of executing program instructions stored in the main memory 312 and may themselves be constructed from one or more microprocessors and/or integrated circuits. In this embodiment, the DPS 300 contains multiple processors and/or processing cores, as is typical of larger, more capable computer systems; however, in other embodiments the computing systems 300 may comprise a single processor system and/or a single processor designed to emulate a multiprocessor system. Further, the processor's 310 may be implemented using a number of heterogeneous data processing systems 300 in which a main processor 310 is present with secondary processors on a single chip. As another illustrative example, the processor unit 304 may be a symmetric multi-processor system containing multiple processors of the same type.

When the data processing system 300 starts up, the associated processor(s) 310 initially execute the program instructions that make up the operating system 324, which manages the physical and logical resources of the DPS 300. These resources include the main memory 312, the mass storage interface 314, the terminal/display interface 316, the network interface 318, and the system bus 322. As with the processor(s) 310, some DPS 300 embodiments may utilize multiple system interfaces 314, 316, 318, 320, and busses 322, which in turn, may each include their own separate, fully programmed microprocessors.

Instructions for the operating system, applications and/or programs (generically referred to as "program code," "computer usable program code," or "computer readable program code") may be initially located in the mass storage devices, which are in communication with the processor's 310 through the system bus 322. The program code in the different embodiments may be embodied on different physical or tangible computer readable media, such as the memory 312 or the mass storage devices. In the illustrative example in FIG. 3, the instructions are stored in a functional form of persistent storage on the direct access storage device 340. These instructions are then loaded into the main memory 312 for execution by the processor 310. However, the program code may also be located in a functional form on the computer readable media 342 that is selectively removable and may be loaded onto or transferred to the DPS 300 for execution by the processor unit 310.

Referring again to FIG. 3, The system bus 322 may be any device that facilitates communication between and among the processors 310; the main memory 312; and the interfaces 314, 316, 318, 320. Moreover, although the system bus 322 in this embodiment is a relatively simple, single bus structure that provides a direct communication path among the system bus 322, other bus structures are consistent with the present disclosure, including without limitation, point-to-point links in hierarchical, star or web configurations, multiple hierarchical buses, parallel and redundant paths, etc.

The main memory 312 and the mass storage devices 340 work cooperatively to store the operating system 324, the application programs 326, and the program data 328. In this embodiment, the main memory 312 is a random-access semiconductor device capable of storing data and programs. Although FIG. 3 conceptually depicts that device as a single monolithic entity, the main memory 312 in some embodiments may be a more complex arrangement, such as a hierarchy of caches and other memory devices. For example, the main memory 312 may exist in multiple levels of caches, and these caches may be further divided by function, so that one cache holds instructions while another holds non-instruction data, which is used by the processor or processors. Main memory 312 may be further distributed and associated with different processors 310 or sets of processors 310, as is known in any of various so-called non-uniform memory access (NUMA) computer architectures. Moreover, some embodiments may utilize virtual addressing mechanisms that allow the DPS 300 to behave as if it has access to a large, single storage entity instead of access to multiple, smaller storage entities such as the main memory 312 and the mass storage device 340.

Although the operating system 324, the application programs 326, and the program data 328 are illustrated as being contained within the main memory 312, some or all of them may be physically located on different computer systems and may be accessed remotely, e.g., via the network 306, in some embodiments. Thus, while the operating system 324, the application programs 326, and the program data 328 are illustrated as being contained within the main memory 312, these elements are not necessarily all completely contained in the same physical device at the same time, and may even reside in the virtual memory of other DPS 300.

The system interface units 314, 316, 318, 320 support communication with a variety of storage and I/O devices. The mass storage interface unit 314 supports the attachment of one or more mass storage devices 340, which are typically rotating magnetic disk drive storage devices, a solid-state storage device (SSD) that uses integrated circuit assemblies as memory to store data persistently, typically using flash memory, or a combination of the two. However, the mass storage devices 340 may also comprise other devices, including arrays of disk drives configured to appear as a single large storage device to a host (commonly called RAID arrays) and/or archival storage media, such as hard disk drives, tape (e.g., mini-DV), writeable compact disks (e.g., CD-R and CD-RW), digital versatile disks (e.g., DVD, DVD-R, DVD+R, DVD+RW, DVD-RAM), holography storage systems, blue laser disks, IBM Millipede devices and the like.

The terminal/display interface 316 is used to directly connect one or more display units 380 to the data processing system 300. These display units 380 may be non-intelligent (i.e., dumb) terminals, such as an LED monitor, or may themselves be fully programmable workstations used to allow IT administrators and users to communicate with the DPS 300. Note, however, that while the display interface 316 is provided to support communication with one or more displays 380, the computer systems 300 does not necessarily require a display 380 because the needed interaction with users and other processes may occur via network interface 318.

The network 306 may be any suitable network or combination of networks and may support any appropriate protocol suitable for communication of data and/or code to/from multiple DPS 300. Accordingly, the network interfaces 318 can be any device that facilitates such communication, regardless of whether the network connection is made using present day analog and/or digital techniques or via some networking mechanism of the future. Suitable communication media 306 include, but are not limited to, networks implemented using one or more of the "Infiniband" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra Wide Band ("UWB") technology, such as that described in FCC 02-48; or the like. Those skilled in the art will appreciate that many different network and transport protocols can be used to implement the communication medium 306. The Transmission Control Protocol/Internet Protocol ("TCP/IP") suite contains suitable network and transport protocols.

One example data processing system 300 is a computer running the Linux or Windows operating systems. However, the methods, systems, and apparatuses in this disclosure apply equally to any data processing system 300 and operating system combination, regardless of whether one or both of the DPS 300 are complicated multi user computing apparatuses, a single workstations, servers, lap-top computers, mobile telephones, personal digital assistants ("PDAs"), video game systems, embedded processors, or the like.

Runtime Environment

Figure 4:
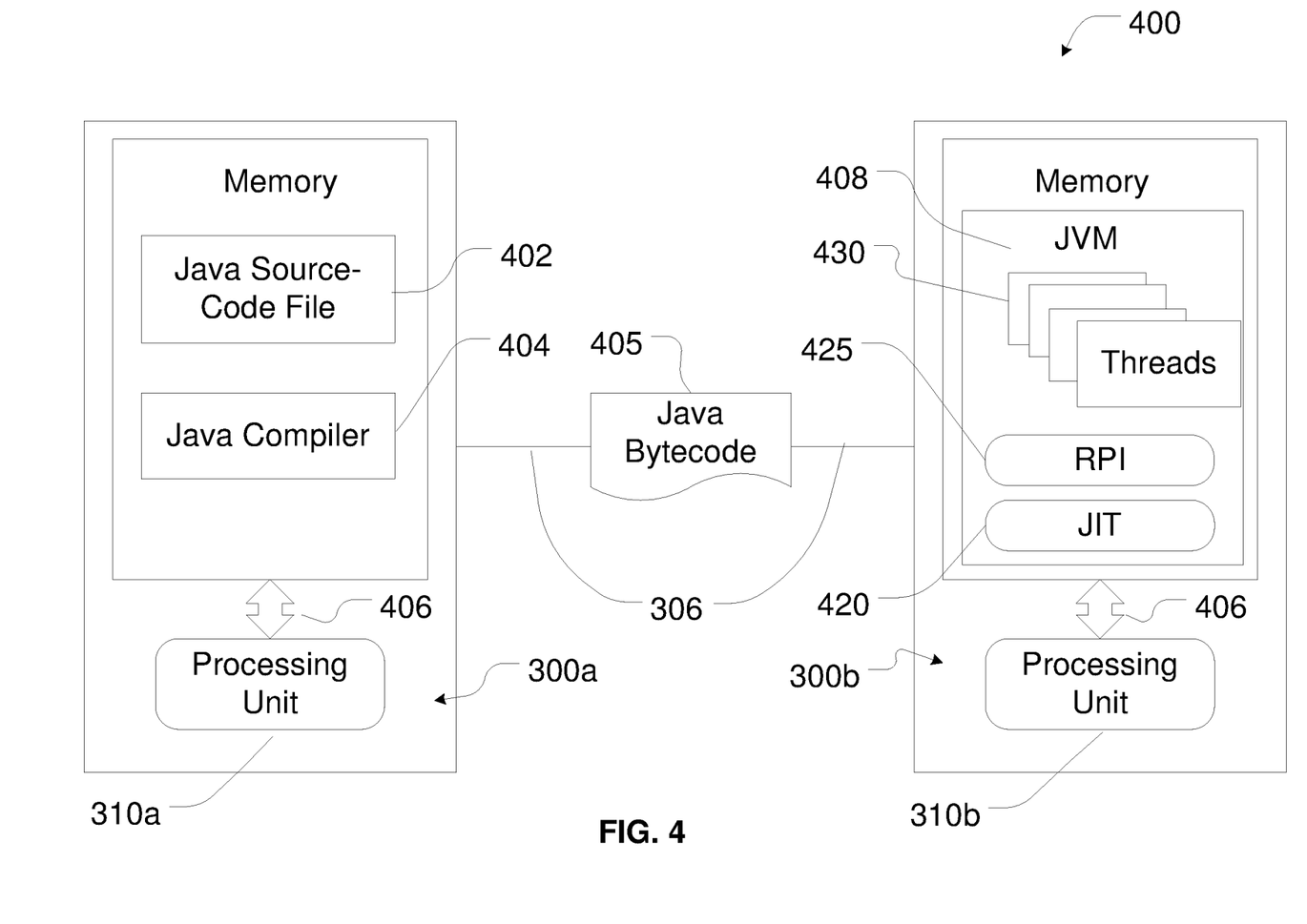
FIG. 4 is a block diagram that depicts a computation environment according to some embodiments.

FIG. 4 depicts a computation environment 400 consistent with some embodiments. In this computation environment 400, data processing units, such as DPUs 310a, 310b, on computing systems 300a, 300b directly execute architecture specific machine code 406. Most computer programs, however, are written in a high-level programming language that is easier for humans to read and understand. A specialized computer program (or group of programs) called a compiler 404 converts the computer code written in the high-level programming language (typically referred to as "source code" 402) into another language, such as bytecode 405 or machine code 406. In most cases, the generated bytecode 405 or binary instructions 406 are compiled on one computer 300a, then is sent to another computer 300b over a network 306.

In the Java programming language, a defined unit of source code, developed for a particular purpose, is commonly referred to as a "method." Java methods are typically compiled from human readable source code 402 to an intermediate form called bytecode 405, which in turn, is typically interpreted by another piece of software, called a Java virtual machine (JVM) 408. In this way, the bytecode 405 can run on any computing system 300 regardless of its underlying computer architecture. A Just-In-Time (JIT) compiler 420 is a component of the JVM 408 that improves the performance of Java applications by further compiling some or all of the bytecodes 405 to native machine code 406. This compilation may occur at or shortly before the code is executed, or may occur after a method is executed e.g., after the method has been called enough times to be deemed worth investing time in compiling. Runtime code patching infrastructure (RPI) 425 is another component of the JVM 408 that can modify the compiled programs (e.g., compiled machine code) at runtime (i.e., while the application is running, not necessarily while the code is executing).

Java, like other programming languages, includes provisions for running multiple groups of instructions in parallel. Such groups of instructions are called "threads" 430. In the Java virtual machine (JVM) 408, each thread 430 is has its own Java stack, which contains data no other thread 430 can access. If multiple threads 430 need to use the same objects or class variables concurrently, the access of the threads 430 to the data must be properly managed. Otherwise, the program will have unpredictable behavior.

To coordinate shared data access among multiple threads 430, the Java virtual machine 408 associates a lock with each software object. A thread 430 needing to lock a particular software object communicates this requirement to the JVM 408. The JVM 408 may then provide the lock to the thread 430. When the thread 430 no longer requires the lock, the thread 430 communicates the termination of its requirement to the JVM 408. If a second thread 430 has requested the same lock, the JVM 408 provides the lock to the second thread 430. In Java language terminology, the coordination of multiple threads 430 that must access shared data is called synchronization.

A single thread 430 in some embodiments is allowed to lock the same object multiple times. For each object, the JVM 408 maintains a count of the number of times the object has been locked. An unlocked object has a count of zero. When a thread 430 acquires the lock for the first time, the count is incremented to one. Each time the thread 430 acquires a lock on the same object, the count is incremented. Each time the thread 430 releases the lock, the count is decremented. When the count reaches zero, the lock is released and made available to other threads 430.

Just-in-Time Code Patching

Some embodiments utilize two separate aspects, method entry patching and runtime code patching, to reduce the overhead and execution delay/lag associated with code patching. The combination of these two techniques allows the JVM 408 to only patch methods which are currently running or about to run, and to amortize that cost across method execution.

Figure 5:
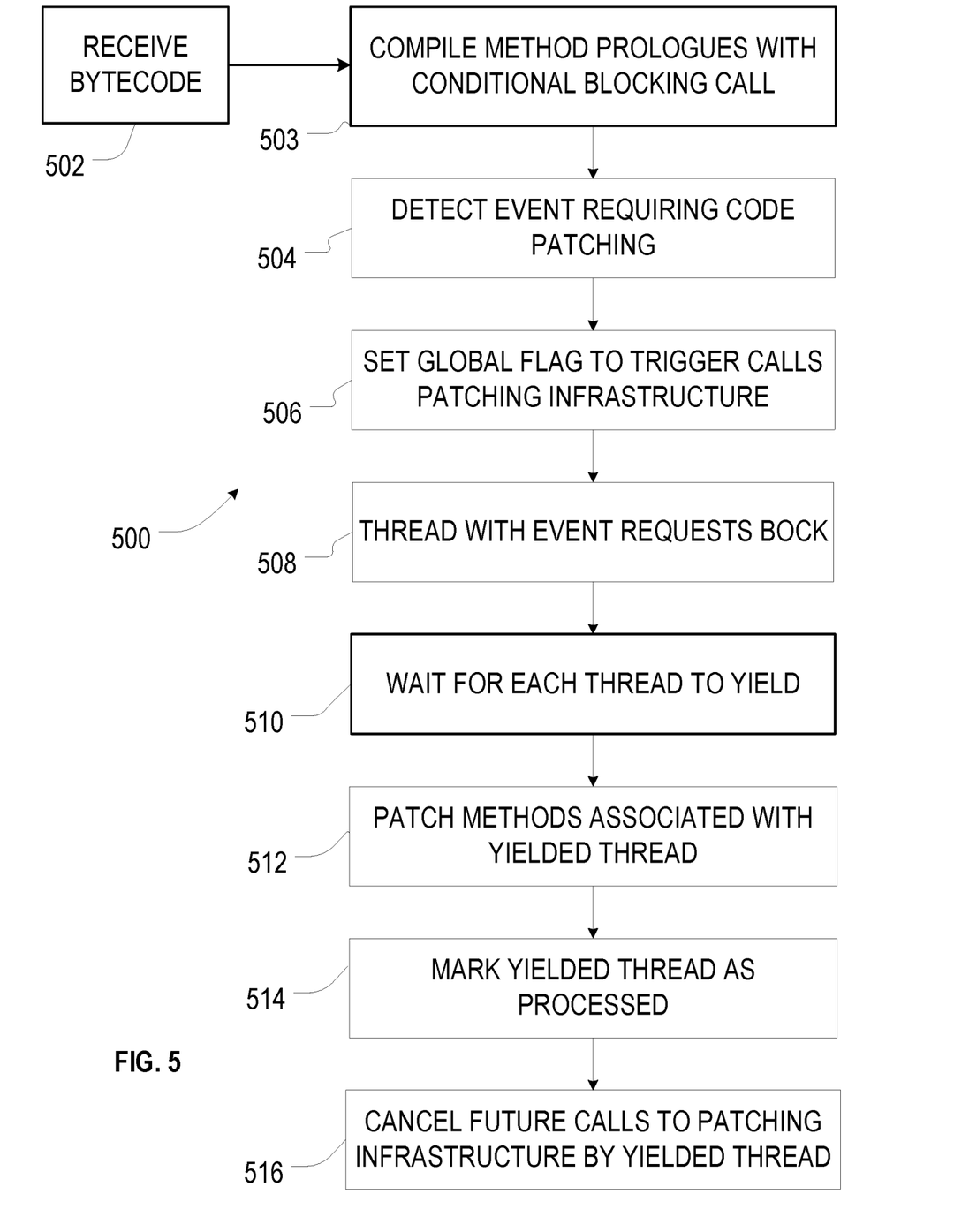
FIG. 5 is a flowchart for a method for just-in-time code patching according to some embodiments.

FIG. 5 is a flowchart of an example process 500 for just-in-time code patching according to some embodiments. At block 502, the JVM 408 receives a Java program comprising a plurality of methods in bytecode form 405 from a remote computer 300a. At block 503, the JIT compiler 420 modifies the prologue for the method(s) to include a conditional blocking call to pass the address of the method to the RPI 425. The condition controlling this test can take a number of different forms in different embodiments. Examples include: testing a flag on the method's metadata, toggling a global or thread-local flag/counter, and a patch point that defaults to a no-op (NOP) instruction, but which can be patched to an unconditional jump to call the RPI 425.

The JVM 408 then begins to execute the Java program. When the JVM 408 encounters an event requiring code patching (at block 504), such as an event that invalidates compile time assumptions, a request to activate profiling instrumentation, or a garbage collection event, the JVM 408 first causes the method prologs to begin calling the RPI 425 (at block 506). The specific mechanism may vary in different embodiments selected at block 502, but could include setting a flag on method metadata, toggling a global or thread local flag, or patching the method body as appropriate.

At blocks 508-510, the JVM 408 sets a flag to indicate that the virtual machine should call the RPI 425 when any currently executing thread yields, which normally occurs frequently because JVMs 408 typically include functionality for global garbage collection and for other runtime system events to be processed. On the first call to the RPI 425 by a thread 430, patching may be performed for any method found on the call stack for that thread 430 at block 512 and the thread 430 will be marked as having been processed at block 514—each of the methods patched will have their conditional call to the RPI 425. In addition, the request to the runtime system for the thread 430 to call the RPI 425 at its next yield will be canceled at block 516. In this way, any call to a method that has not been processed on a thread 430 that has been processed (after this initial halt) will simply patch the method being called and deactivate the conditional jump to the RPI 425 in that method prolog. If any threads remain unpatched, the system may then return to block 510 wait for those threads to yield; otherwise, the system may execute the patched code.

Figure 6:
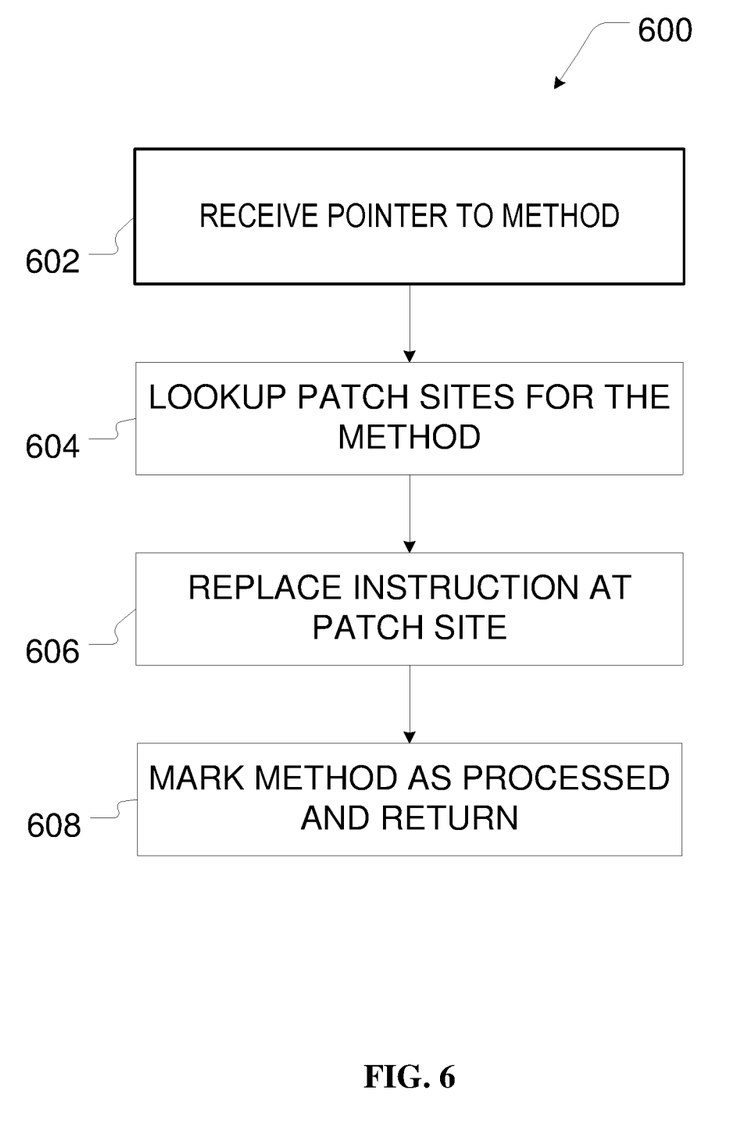
FIG. 6 is a flowchart that illustrates some embodiments of the runtime patching infrastructure in operation.

FIG. 6 is a flowchart illustrating a process 600, according to some embodiments of the RPI 425 in operation. At block 602, the JVM 408 receives a pointer to a method. The RPI then follows the pointer to the method and looks up a list of patch site(s) in the method at block 604. In some embodiments, the patch site location(s) may be recorded in a side data structure (not shown). At block 606, the RPI 425 replaces (e.g., overwrites) the instruction at the patch site(s) with a different instruction. One common such replacement is to replace a JUMP instruction with a NOP instruction, or vice-versa, but other replacements are consistent with some embodiments. The JVM 408 then marks the method as processed and returns control to the thread 430 that triggered the RPI at block 608. Note that some embodiments might stop all of the threads 430 at once, all running methods to be patched and then execution to continue. Other embodiments might allow threads 430 to process the event one-at-a-time.

One potential feature and advantage of some methods described herein is that execution is not serialized to facilitate code patching and that only methods that are currently executing need to be patched before the thread triggering the patching can be unblocked to continue execution. In the case where patching is required only to be reversed shortly after, such as for activating profiling code for a defined sampling window, this approach means only methods executed during the sampling window will be modified, which may save a significant amount of execution time.

Another potential feature and advantage of some methods described herein is that the blocking nature of the call to the RPI 425 in the method prologue need only block when patching is required for correctness. Thus, in the case of patching in profiling instrumentation or other options code, some embodiments make it possible to make the call non-blocking and to patch the method body while other threads 430 run the method body. Another feature and advantage is that, when an event occurs (e.g., violation of compile-time assumptions), those events do not need to be delayed from completing and their effects becoming visible until after the associated patch points have been found and modified.

While the embodiments herein have been described with reference to responding to changes in the program's executing environment, other applications are within the scope of this disclosure. For example, some embodiments may be used for to enable and disable code profiling during execution. This application may be advantageous because such use could drastically increase the number of points in the compiled code that would need to be modified. Similarly, some embodiments may be used to enable or disable garbage collection during runtime. Additionally, some embodiments may also be used for in conjunction with other virtual instruction sets, such as the Technology Independent Machine Interface (TIMI) for the IBM i computer platform, Ruby, .Net, Perl, Python, JavaScript, and the like.

Concurrent Scavenger Example

Figure 7:
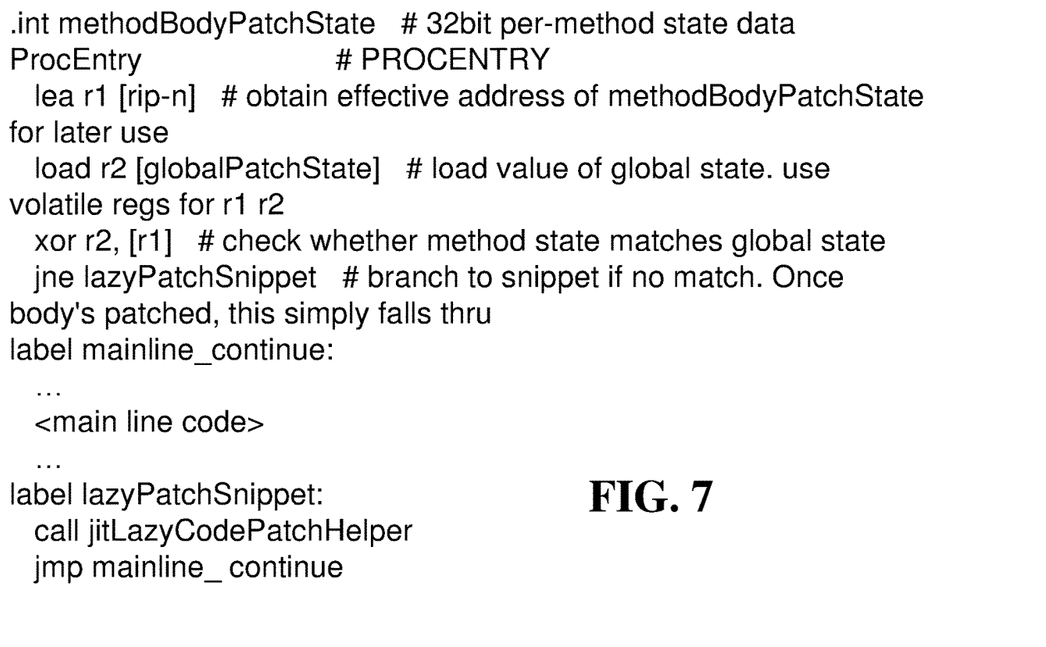
FIG. 7 is pseudo-code for a methodBodyPatchState routine consistent with some embodiments.
Figure 8:
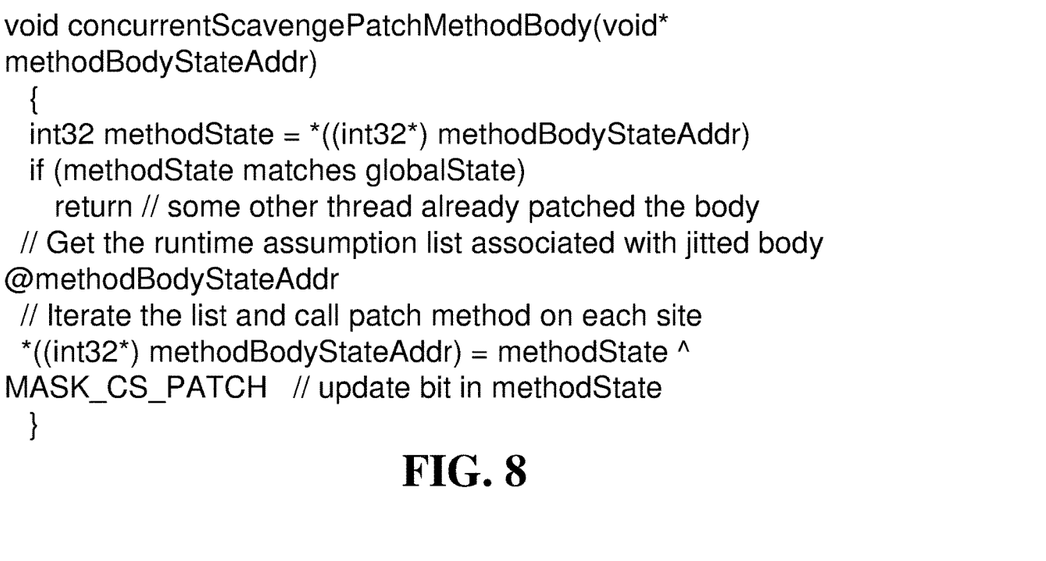
FIG. 8 is pseudo-code for a concurrentScavengePatchMethodBody routine consistent with some embodiments.
Figure 9:
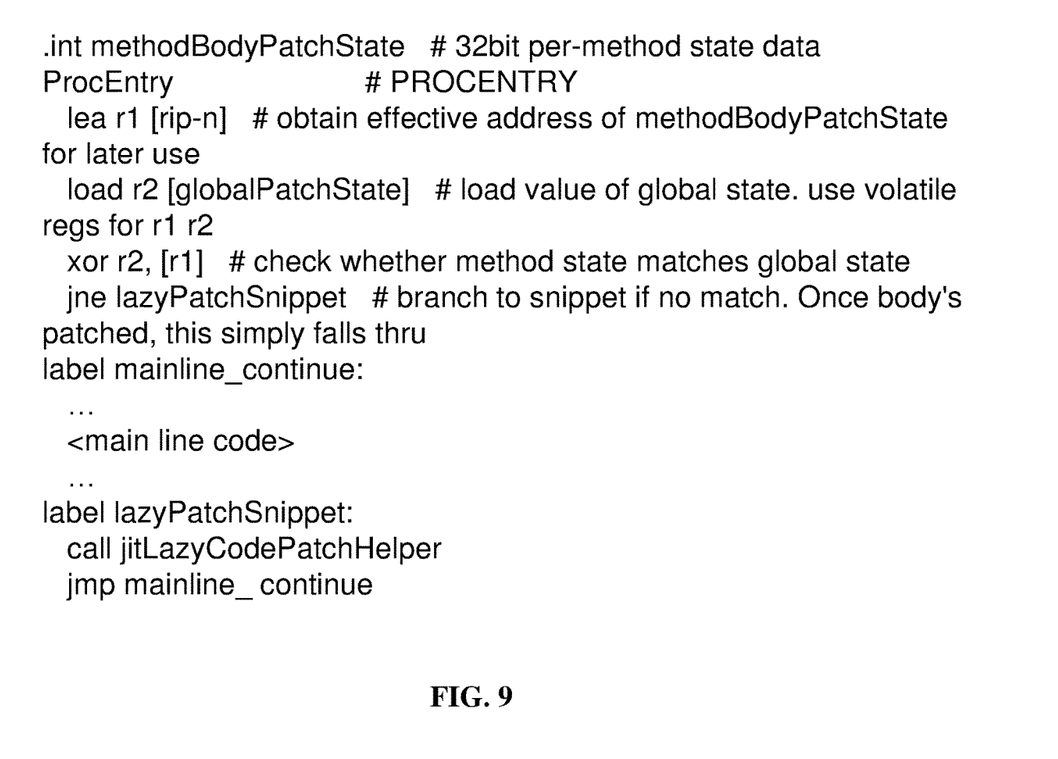
FIG. 9 is pseudo-code for a jitLazyCodePatchHelper routine consistent with some embodiments.

FIGS. 7-9 illustrate some embodiments of the invention as applied to the concurrent scavenger (CS) in the Eclipse OpenJ9 language runtime environment 408. In this runtime environment 408, the read barrier (rdbar) instruction sequence for CS is depicted in FIG. 7, where outlinedRdbarLabel performs additional range check and calls the garbage collection (GC) helper for object relocation. While CS is inactive, the above compare always fails and the jump is always not taken.

Some embodiments may patch and replace the compare/jump instruction in FIG. 6 with "No Operation" instructions (NOPs), such that while CS is inactive, minimal extra path length is incurred compared to a standard generational garbage collector. Conversely, when CS is active, all previously patched NOPs must now be un-patched (i.e., reverted to load and cmp instructions to ensure the runtime environment 408 performs the range check). Each of these rdbar locations in the JITed body is represented by a new NOP patch site, called NOPConcurrentScavengeRdBarSite in this example. Each platform 300b should encapsulate information for this type of patch site at code generation time and devise the proper handling of the patching/unpatching sequence.

One challenge can be that the sheer number of reference field loads in all method bodies makes the patching very costly. To address this challenge, some embodiments amortize the patching cost using two techniques. First, during the garbage collection-start pause, all JITed method bodies currently on stack in each thread 430 need be patched with the load-and-compare (i.e., range check) instructions because they must run with rdbar once the pause ends and CS is active. Because the garbage collectors in the OpenJ9 runtime environment 408 already do a stack walk for each thread 430 during the garbage collection-start pause to collect root objects, this change simply calls a helper to patch the method body as the helper visits each JITed frame. This may incur a small pause time increase, but that pause is normally acceptable as the frame count should be bounded and relatively small for most applications.

Second, for most methods, patching may be done on-demand. This means, if a method is called and the current state of the method body requires patching, upon entry as part of the prologue, the RPI will execute code that patches all of the necessary patch sites in the method. Then, once the patching is completed, the method state is updated, so that subsequent entries into the method will not do the patching over and over again.

Some embodiments may introduce a state value for each JITed method body. For the purpose of CS, this value can represent two states: NOT_PATCHED (i.e., all CS patch sites will run the rdbar instruction comparison, which may call the garbage collector) or PATCHED (all CS patch sites contain a NOP instruction). At any given time, a method body in these embodiments can only be in one of these two states. On the other hand, these embodiments may also have a global state that tells them whether CS is either active or inactive. In these embodiments, the NOT_PATCHED method state matches the CS_ACTIVE global state, and PATCHED state matches CS_INACTIVE. So, upon method entry, these embodiments may compare the per-method state with the global one—if they match, it means the method is in the correct state and no patching is required; if they don't match, these embodiments need to patch/unpatch the method body to the other state; and once the patching/unpatching is done, the per-method state is flipped. This ensures the patching/unpatching is done only once. During patching/unpatching, each NOPConcurrentScavengeRdBarSite associated with the method is iterated to patch the site.

As it represents two states, the per-method CS state in this example can be encoded as 1 bit in a 32-bit data: int32 methodBodyPatchState (FIG. 7); the global CS active/inactive state can similarly be encoded as the same bit in a global 32-bit data int32 globalPatchState, with proper mask generated to operate on them:

define MASK_CS_PATCH 0x1.

globalPatchState can be updated as follows:

At CS start: globalPatchState |=MASK_CS_PATCH

At CS end: globalPatchState &=~MASK_CS_PATCH

One potential advantage of this arrangement is its extensibility, as another component (such as JProfiling) which also requires on-demand patching/unpatching of method body, may share the same 32-bit data using another bit, and thus sharing the same mechanism that triggers patching/unpatching.

The patching triggering mechanism is described in the following with pseudo-code/assembly. In the prologue, at the JIT entry point, the OpenJ9 runtime environment 408 inserts a compact sequence of instructions that retrieve both methodBodyPatchState (FIG. 7) and globalPatchState, and compares them with an XOR comparison. If any of the bits are mismatched, meaning patching would be required for the components corresponding to those bits, the OpenJ9 runtime environment 408 branches forward to a snippet, which calls jitLazyCodePatchHelper (FIG. 9). jitLazyCodePatchHelperchecks checks each mismatched bit and invokes the individual helper that performs the patching for that bit.

For the CS bit, the helper in this example is defined as void concurrentScavengePatchMethodBody (void*methodBodyStateAddr) (FIG. 8), which takes as argument the address of methodBodyPatchState (FIG. 7) in the method body. Inside the function, it uses the address to retrieve the method body info such as its list of patch sites. Patching may be performed at each site. Finally, the bit in methodBodyPatchState (FIG. 7) may be flipped to match the global bit. When all helpers return, methodBodyPatchState (FIG. 7) now matches globalPatchState and subsequent calls to the method will simply fall through in the mainline without going to the snippet. In addition to its extensibility, another potential advantage of this patching strategy is flexibility in that a method may be patched only if it's executed. If a method is not executed, it may be left in its state regardless of what the global state is. For example, if a method is in the PATCHED (CS sites may contain a NOP instruction) state and did not run in the last CS active period, it stays in PACTHED; if it runs in the next CS_inactive period, the check in the prologue will find its state matches the global state and no patching is done. In the case of multiple threads 430, all attempts to patch the sites at the same time, the OpenJ9 runtime environment 408 does not block them and serialize their accesses, but rather lets them go through the patching helper because the effect of patching should be idempotent such that doing it multiple times should leave no side effect provided an instruction is patched atomically. Blocking or spinning the threads 430 may use more CPU time than desirable and increase the prologue size more than desirable, so instead, the system may allow them to proceed and ensure forward progress.

One enhancement to reduce the cost of patch/unpatch consistent with some embodiments is to focus on the rdbar instructions in non-cold blocks, or blocks with a minimal frequency. This is because field loads in a cold block are not expected to execute frequently, so the CS implementation can cut down the number of patch sites by focusing on frequently executed code paths. Another potential feature and advantage of some embodiments is alignment. For CS, the GC-end pause does not involve a stack walk, which means a thread 430 can be paused in the middle a method body. Upon resuming execution, it is possible that a thread 430 will start executing the rdbar instructions while another thread 430 is patching them. If instruction patching needs to be done atomically, that means the instructions to be patched and their positions in memory may need to adhere to much more strict requirements, depending on the target hardware architecture. Also, on architectures with a relatively weak memory model, it may be desirable to insert memory barriers to ensure a consistent view of the state of the patch sites.

Computer Program Product

Although the present invention has been described in detail with reference to certain examples thereof, it may be also embodied in other specific forms without departing from the essential spirit or attributes thereof. For example, the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

General

Aspects of the present invention were described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. Moreover, the flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention.

Therefore, it is desired that the embodiments described herein be considered in all respects as illustrative, not restrictive, and that reference be made to the appended claims for determining the scope of the invention.

I claim:

1. A computer-implemented method for runtime code patching, comprising:
    determining, by a runtime environment, that a runtime event occurred;
    in response to the determination, by the runtime environment:
        blocking processing of the runtime event;
        runtime patching a method in response to an executing thread associated with the method yielding, wherein each executing thread receives runtime patching and wherein only methods currently executing are runtime patched;
        invoking a runtime code patching infrastructure on each yielded thread; in response to a first call to the runtime code patching infrastructure by one of the yielded threads: code patching any method found on a call stack of the one of the yielded threads;
        marking the one of the yielded threads as processed; cancelling future instructions for the one of the yielded threads to call the runtime code patching infrastructure at a next yield; and
        unblocking the runtime event to continue execution.

2. The method of claim 1, further comprising: in response to a call to a method that has not been processed: runtime patching the method being called; and deactivating a conditional jump to the runtime code patching infrastructure in a prologue of the method being called.

3. The method of claim 1, wherein the determining comprises: updating a global condition flag; and by the runtime environment, checking the global condition flag when each method is invoked.

4. The method of claim 1, further comprising determining, by the runtime environment, that the runtime event invalidates compile-time assumptions.

5. The method of claim 1, wherein the runtime patching comprises: toggling a global state to force a method entered to yield to a runtime code patching infrastructure if the method entered has not yet been patched; requesting executing threads to yield to the runtime code patching infrastructure; and responsive to an executing thread yielding, patching any method found running on the executing thread; and wherein the unblocking is performed once all threads have been processed.

6. The method of claim 1, wherein the runtime event is chosen from the group consisting of a request to profile the generated method and a garbage collection event by the runtime environment.

7. The method of claim 1, wherein runtime patching comprises: recording a patch location in a side data structure; and changing one or more instructions located at the patch location.

8. The method of claim 1, wherein the runtime patching atomically patches all executing methods.

9. A method for lazy runtime code patching, comprising:
    in response to a runtime event in a first thread of a program comprising a plurality of threads, triggering method entries in the plurality of threads to call a code patching infrastructure of a runtime environment;
    waiting for an executing thread in the plurality of threads to yield; in response to the executing thread yielding, runtime patching a method on a call stack belonging to the executing thread by the code patching infrastructure;

marking the executing thread yielding as processed; and cancelling future instructions for the executing thread yielding to call the runtime code patching infrastructure at a next yield.

10. The method of claim 9, further comprising: in response to the patching of the method, restoring an entry sequence in the runtime patched method.

11. The method of claim 10, wherein the runtime patching atomically patches all executing methods.

12. The method of claim 10, further comprising: detecting invocation of a new method being called from the executing thread; and in response to the detecting, triggering the new method to call the code patching infrastructure of the runtime environment.

13. The method of claim 10, further comprising, by the code patching infrastructure: recording a patch location in a side data structure; and changing an instruction located at the patch location.

14. A computer system, comprising:

a processor;

a memory coupled to the processor, the memory containing:

a just-in-time compiler; and a runtime environment that executes instructions generated by the just-in-time compiler, wherein the runtime environment is further configured to:

determine that a runtime event occurred;

in response to the determination:

block processing of the runtime event;

runtime patch a method in response to an executing thread associated with the method yielding, wherein each executing thread receives runtime patching and wherein only methods currently executing are runtime patched;

invoke a code patching infrastructure on each yielded thread; in response to a first call to the code patching infrastructure by one of the yielded threads: code patching any method found on a call stack of the one of the yielded threads;

marking the one of the yielded threads as processed; cancelling future instructions for the one of the yielded threads to call the code patching infrastructure at a next yield; and     unblock the runtime event to continue execution.

15. The system of claim 14, wherein the runtime environment comprises a JAVA runtime environment.

16. The system of claim 14, wherein the runtime environment is further adapted to: in response to a call to a method that has not been processed: runtime patch the method being called; and deactivate a conditional jump to the code patching infrastructure in a prologue of the method being called.

17. The system of claim 14, wherein the runtime patching comprises: blocking processing of the runtime event; toggling a global state to force a method entered to yield to a runtime code patching infrastructure if the method entered has not yet been patched; requesting executing threads to yield to the runtime code patching infrastructure; in response to an executing thread yielding, patching any method found running on the executing thread; and wherein the unblocking is performed once all threads have been processed, unblocking the runtime event processing.

* * * * *